United States Patent [19]

Groppe

[11] Patent Number: 5,086,464
[45] Date of Patent: Feb. 4, 1992

[54] TELEPHONE HEADSET FOR THE HEARING IMPAIRED

[75] Inventor: Alvin F. Groppe, Germantown, Tenn.

[73] Assignee: Artic Elements, Inc., Germantown, Tenn.

[21] Appl. No.: 487,846

[22] Filed: Mar. 5, 1990

[51] Int. Cl.$^5$ .................. H04M 1/00; H04M 11/00; H04R 25/00; A42B 00/00

[52] U.S. Cl. .......................... 379/430; 2/171; 379/52; 379/419; 379/428; 379/433; 381/68; 381/68.1

[58] Field of Search ............... 379/52, 430, 441, 443, 379/457, 428, 419; 381/67, 68, 68.5, 69, 150, 182, 183, 187, 68.1; 2/171

[56] References Cited

U.S. PATENT DOCUMENTS

| | | | |
|---|---|---|---|
| 2,554,834 | 5/1951 | Lavery | 179/107 |
| 2,837,607 | 6/1958 | McGee | 179/107 |
| 3,396,245 | 8/1968 | Flygstad | 379/52 |
| 4,490,585 | 12/1984 | Tanaka | 379/52 |
| 4,622,440 | 11/1986 | Slavin | 381/68.1 |
| 4,764,957 | 8/1988 | Angelini et al. | 379/433 |
| 4,918,757 | 4/1990 | Jassen et al. | 2/171 |
| 5,010,575 | 4/1991 | Marutake et al. | 381/68 |

FOREIGN PATENT DOCUMENTS 0034100 2/1989 Japan ..................... 381/68

OTHER PUBLICATIONS

Radio Shack Catalog #446, pp. 36 37 and 95, 1989.
Unitron E90.00530-176-000, Dec. 1990.

Primary Examiner—James L. Dwyer
Assistant Examiner—William Cumming
Attorney, Agent, or Firm—Walker & McKenzie

[57] ABSTRACT

An adjustable telephone headset for the hearing impaired comprising a left and a right ear piece, a speaker within each ear piece, an input device, such as a microphone or magnetic induction pickup within one of the ear pieces, and an amplifier connected between the input device and the speaker. Optionally, a switch may select between either a microphone or a magnetic induction pickup as the choice of input device. A wearer of the headset may place a telephone receiver against the microphone or magnetic induction pickup, allowing an amplified telephone conversation to be heard by both ears. Independent volume controls for each speaker allow individual adjustment to compensate for variations in hearing loss, and optional tone controls for each speaker similarly allow optimum compensation for differences in tonal response in the wearer's ears. An optional remote microphone allows use as a conventional hearing aid when not engaged in telephone conversation.

6 Claims, 1 Drawing Sheet

TELEPHONE HEADSET FOR THE HEARING IMPAIRED

BACKGROUND OF THE INVENTION

1. Field of the Invention

The present invention relates, in general, to hearing aids for the hearing impaired, and particularly to hearing aids of the class adapted to be utilized in connection with a telephone receiver.

2. Information Disclosure Statement

A preliminary patentability search in class 379, subclass 52 produced the following patents: Lavery, U.S. Pat. No. 2,554,834, issued May 29, 1951; McGee, U.S. Pat. No. 2,837,607, issued June 3, 1958; and Flygstad, U.S. Pat. No. 3,396,245, issued Aug. 6, 1968. While each of the above patents disclose various hearing aid apparatus for use with telephone receivers, none disclose or suggest the present invention. More specifically, none of the above patents disclose or suggest a telephone headset for the hearing impaired with a single input means against which the telephone receiver may be placed, with separate volume controls for each ear, which permits the user to hear the conversation from a telephone receiver with both ears.

Lavery, U.S. Pat. No. 2,554,834, describes a coupling for a telephone receiver in which a hearing aid device, inductively coupled to the telephone receiver, amplifies the conversation for receipt by an ear of the user. Lavery has no headset, as does the present invention, and does not allow the conversation to be heard by the user through both ears. Additionally, Lavery teaches against the use of acoustic pickup means, such as a microphone, which may be used in accordance with the present invention.

McGee, U.S. Pat. No. 2,837,607, describes a pair of hearing aid devices for use with a telephone receiver in which the receiver is held between two inductive pickup devices, each on a separate hearing aid. Volume is balanced between the two hearing aids by placing the telephone receiver closer to one inductive pickup than the other. The present invention does not require that the receiver be held between a pair of inductive pickups, but instead has one input means for the telephone receiver to be placed thereagainst, and the conversation picked up by the single input means is transmitted to both ear pieces. Unlike the McGee patent, the present invention has a main volume control as well as a separate volume control for each ear piece and is constructed as a headset, to be worn on the head of the hearing impaired user.

Flygstad, U.S. Pat. No. 3,396,245, describes a hearing aid device for use with a telephone receiver in which a magnetic switching means (a "magnetic reed switch") detects the presence of the telephone receiver and switches the device automatically from a normal mode of operation into a telephonic mode in which the telephone receiver is inductively coupled to the hearing aid. Flygstad does not show or describe the use of a headset in the manner prescribed by the current invention.

SUMMARY OF THE INVENTION

Many persons who have difficulty in hearing wear some type of hearing aid which magnifies sound as it enters the ears. The degree of hearing loss varies from person to person, and even from ear to ear with a given person, many times with one ear capable of picking up certain audio frequencies or tones and the other ear capable of picking up different audio frequencies or tones. Existing hearing aids for use with telephone receivers are capable of effectively amplifying telephone conversations for one ear only, thus limiting the hearing impaired user to the ability of a single ear to hear and understand telephone conversations.

It is an object of the present invention to provide an improved telephone headset for the hearing impaired which is simple and compact, in which a telephone receiver may be placed adjacent an input means in the headset, such as a microphone or a magnetic induction pickup, thus allowing amplification of a telephone conversation to both ears of a hearing impaired user, increasing the ability of the user to understand the conversation. The device is constructed as a headset, and may be worn over the top of the head in the manner of a conventional headset, or may be worn so that the headset passes below the chin and across the neck. The construction as a headset, while allowing both ears to hear the telephone conversation, also blocks out background noise that might otherwise make it difficult to hear the conversation.

It is a further object of one possible embodiment of the present invention to provide an optional remote microphone which may be clipped onto the user's clothing or other suitable place, enabling the telephone headset to be used as a conventional hearing aid when not amplifying a telephone conversation.

DESCRIPTION OF THE PREFERRED EMBODIMENT

Figure 1:
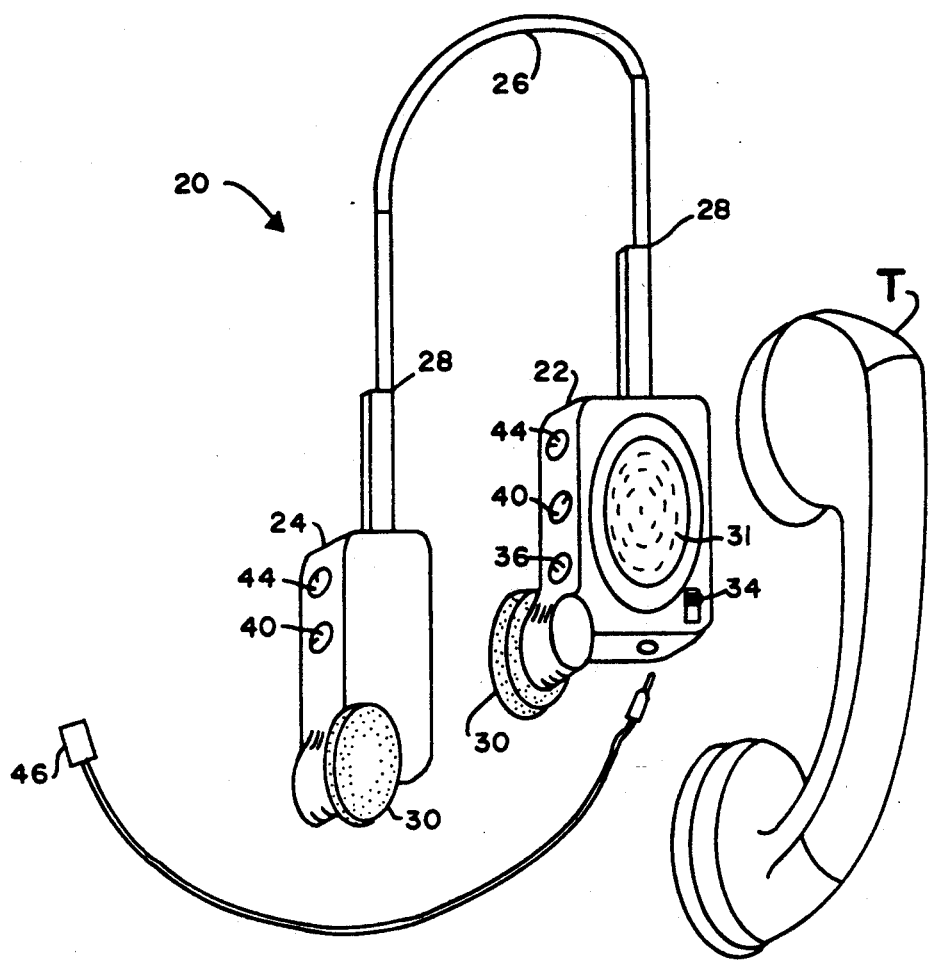
FIG. 1 is a view of a headset in accordance with this invention, showing the input means against which the telephone receiver is placed, as well as the optional remote microphone.

Referring to FIG. 1, the telephone headset 20 for the hearing impaired comprises a left ear piece 22, a right ear piece 24, a connecting headband 26 between the ear pieces, and adjusting means 28, well known to those skilled in the art, for adjustment of the headset upon the wearer's head. Each ear piece has a speaker means 30, well known to those skilled in the art, for transmittal of an amplified telephone conversation to each respective ear of the wearer. One of the ear pieces contains an input means 31 against which a telephone receiver T may be placed, allowing input means 31 to receive an unamplified telephone conversation from the telephone receiver T.

Figure 2:
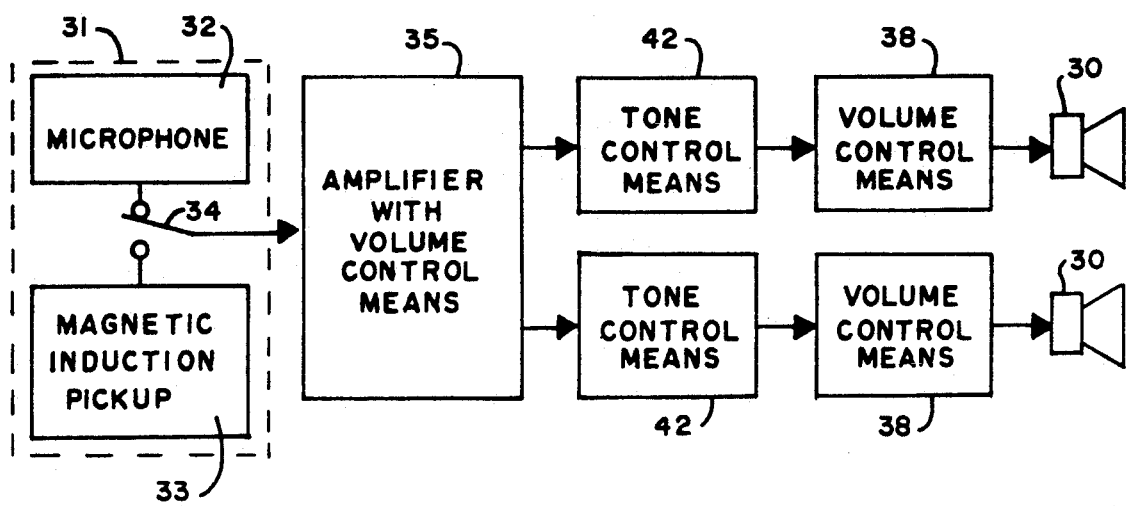
FIG. 2 is a block diagram of the current invention, showing the basic component parts.

Referring to FIG. 2, the headset is seen to contain an amplifier 35, well known to those skilled in the art, connected between input means 31 and the speaker means 30. The amplifier 35 may be understood to contain a power source, such as a battery (not shown), to provide the necessary power in the usual manner. The amplifier 35 also has a conventional main volume control means, adjustable by knob 36 shown in FIG. 1, for simultaneous adjustment of the amplified output of amplifier 35 to each speaker means 30, to compensate for variations encountered between different telephone connections, as well as to suit the preference of the wearer of the headset.

Input means 31 preferably comprises a microphone 32, a magnetic induction pickup 33, both well known to those skilled in the art, and switching means, such as switch 34, for selecting between the microphone and the magnetic induction pickup as the input to amplifier 35 in a manner that is also apparent to those skilled in the art. Magnetic induction pickup 33 operates in the conventional manner to receive magnetic field fluctuations when in close proximity to telephone receiver T and generates a responsive signal for input to amplifier 35.

Each ear piece 22, 24, has well known volume control means 38, adjustable by knob 40 shown in FIG. 1, to allow the wearer to independently control the volume of each speaker means 30, and compensate for differences in hearing ability between his or her respective ears. Similarly, each ear piece 22, 24, may also have a well known tone control means 42, adjustable by knob or set screw 44 in FIG. 1, allowing the wearer to independently control the tonal quality of the conversation as heard through each speaker means 30, again to compensate for differences in hearing ability between his or her respective ears.

Optionally, the headset may include a conventional remote microphone 46, attachable to the wearer's tie or other article of clothing, which may be connected to the amplifier in a manner well known to those skilled in the art, enabling the headset to be used as a conventional hearing aid when needed.

Although the present invention has been described and illustrated with respect to a preferred embodiment and a preferred use therefor, it is not to be so limited since modifications and changes can be made therein which are within the full intended scope of the invention.

I claim:

1. A telephone amplification headset for wearing on the head of a hearing impaired user for use with a telephone receiver, comprising:
   (a) a left and a right ear piece, each ear piece including speaker means for transmittal of an amplified telephone conversation to each respective ear of the user;
   (b) input means contained in one of the ear pieces for receipt of an unamplified telephone conversation when the telephone receiver is placed adjacent the input means, said input means comprising a microphone;
   (c) an amplifier connected between the input means and the speaker means for amplification of a signal from the input means and for excitation of the speaker means;
   (d) a left and a right volume control means for independent control of the volume of the amplified conversation to each respective speaker means; and,
   (e) remote microphone means for connection to the amplifier to amplify audio sounds to the user's ears.

2. A telephone amplification headset for wearing on the head of a hearing impaired user for use with a telephone receiver, comprising:
   (a) a left and a right ear piece, each ear piece including speaker means for transmittal of an amplified telephone conversation to each respective ear of the user;
   (b) input means contained in one of the ear pieces for receipt of an unamplified telephone conversation when the telephone receiver is placed adjacent the input means, said input means comprising a magnetic induction pickup;
   (c) an amplifier connected between the input means and the speaker means for amplification of a signal from the input means and for excitation of the speaker means;
   (d) a left and a right volume control means for independent control of the volume of the amplified conversation to each respective speaker means; and,
   (e) remote microphone means for connection to the amplifier to amplify audio sounds to the user's ears.

3. A telephone amplification headset for wearing on the head of a hearing impaired user for use with a telephone receiver, comprising:
   (a) a left and a right ear piece, each ear piece including speaker means for transmittal of an amplified telephone conversation to each respective ear of the user;
   (b) input means contained in one of the ear pieces for receipt of an unamplified telephone conversation when the telephone receiver is placed adjacent the input means;
   (c) an amplifier connected between the input means and the speaker means for amplification of a signal from the input means and for excitation of the speaker means;
   (d) a left and a right volume control means for independent control of the volume of the amplified conversation to each respective speaker means; and,
   (e) remote microphone means for connection to the amplifier to amplify audio sounds to the user's ears, said input means comprising:
      i. a microphone;
      ii. a magnetic induction pickup; and,
      iii. switching means for connecting either the microphone of the input means or the magnetic induction pickup to the amplifier.

4. A telephone amplification headset for a hearing impaired user as recited in claim 1, in which the headset includes a left and a right tone control means for independent control of the tonal quality of the conversation to each respective speaker means.

5. A telephone amplification headset for a hearing impaired user as recited in claim 2, in which the headset includes a left and a right tone control means for independent control of the tonal quality of the conversation to each respective speaker means.

6. A telephone amplification headset for a hearing impaired user as recited in claim 3, in which the headset includes a left and a right tone control means for independent control of the tonal quality of the conversation to each respective speaker means.

* * * * *